United States Patent Office 3,532,857
Patented Oct. 6, 1970

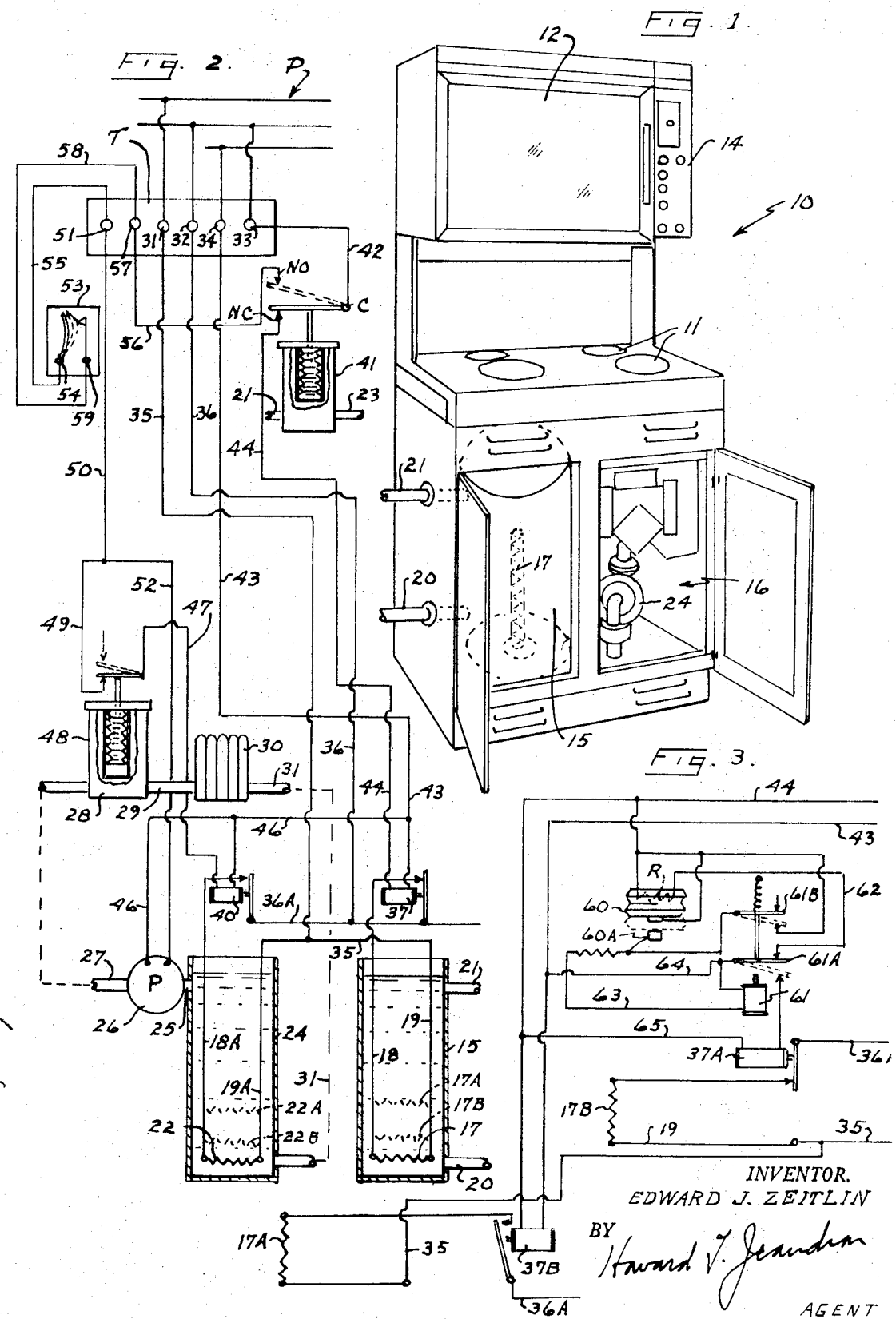

3,532,857
COMBINATION ELECTRIC COOKING, HEATING AND HOT WATER SUPPLY
Edward J. Zeitlin, New York, N.Y., assignor to Standard Instrument Corporation, New York, N.Y.
Filed Aug. 10, 1966, Ser. No. 571,459
Int. Cl. H05b 1/02
U.S. Cl. 219—479        4 Claims

ABSTRACT OF THE DISCLOSURE

A cabinet containing a plurality of electical heating appliances in which all are connected to a control circuit so that there is a sequence of power supply without an undue surge and in which the power demand is divided to produce a sequence of power supply in lesser amplitude than the final demand for all appliances.

This invention relates to an appliance for the home and more particularly to an improved free-standing compact cooking range having a built-in home heating system and domestic hot water supply.

An appliance such as an electric cooking range has been designed to provide a table top or counter height cooking space with a plurality of burners, generally there is also provided an oven and broiler. The newer designs seem to indicate a preference for placing the oven and broiler above the counter height burners, generally at or slightly below eye level with glass enclosure to provide a clear view of their contents when baking, broiling, etc. When this unit is supplied as a separate free standing combination range, there is considerable under the counter space that is not efficiently utilized. Since many of the installations of an electric range today are in one or two room apartments, all space must be efficiently utilized. Therefore the under counter space of a range lends itself to other uses of the electric power available. There are other utilities that are dependent upon electric power such as heat and domestic hot water supply. Although heat has in the past been supplied from a central system, this entails considerable pre-planning and extensive installation. The control of the heat supplied is difficult as there must be sufficient heat for the most demanding tenant and ability to furnish the demand for all tenants at any time. With electric heating this can create huge load demands at critical periods which is contrary to the wishes of the local power companies. To spread out these power demands many installations are preheated or cycled. Modern planning now stresses the elimination of huge central supply systems for heat and hot water and the independent installation of all components of power operated appliances in each apartment. That is, with an electric power supply available in each apartment, which is the easiest installation in the construction of the building, all appliances required to furnish the needs of the tenants may be grouped or combined in a minimum space and provide a more efficient complete operating unit. For example, the tenant will require means for cooking, a supply of hot water and means to heat or cool the apartment, other services may be desired and may be added, but cooking, hot water and especially heating means are absolutely necessary. With the evolution of built-in combination appliances there is now provided more compact and efficient designs in the appliance field, most of these combinations are more economical in use, space saving and designed to satisfy the domestic market. With the modern counter top electric range providing ample under the counter space, it is an object of this invention to utilize this space for the installation of both an electric hydronic apartment heating element and a domestic hot water tank and element.

With the enormous electric power demands now required to keep our densely populated area properly supplied, there are certain restriction or at least certain requirements laid down by each local power company. The supply of electric power may seem to be limitless, but unfortunately this is not true and serious consequences may result, or be caused by an indiscriminate use of electric power, such as the black-outs that have been triggered in different connected power systems. It is well known by the power companies that known maximum loads must be met at certain hours of the day and certain minimum loads occur at other hours. Therefore the power systems are set up to accommodate the power supply to provide the maximum load when needed and to shunt or curtail the supply in a gradual increase or decrease. Therefore it is an object of this invention to assist the power companies in maintaining an acceptable gradual increased power supply.

A further object of this invention is to design appliance installations utilizing a heavy power demand so that at no time will the total power demand be turned on to provide a heavy pulse of power rather the power demand is obtained by providing a plurality of steps, that is, the total demand may be divided into two, three or four steps in delayed intervals so that no power surge can be produced.

Further objects of this invention shall be apparent by reference to the accompanying detailed description and the drawing in which:

FIG. 1 is a perspective elevation view of the combination electric appliance,

FIG. 2 is a schematic illustration of the power circuit and its components, and

FIG. 3 is a schematic illustrating a further embodiment of this invention.

Referring to the drawings and particularly FIG. 1 there is illustrated a combination electric cooking, heating and hot water supply built into a single free standing cabinet 10. Cabinet 10 is designed so that there are a plurality of electric cooking burners 11 properly distributed upon a counter height standard range. Also positioned in a desired eye level relationship is a broiler and oven 12 and to the right of the broiler and oven 12 there are provided a plurality of cooking controls 14, the burners 11 and broiler and oven 12 being electrically connected to the controls 14 in the standard manner and not shown herein. With a cabinet 10 as illustrated in FIG. 1, the under counter space is ample to permit the installation of a domestic hot water tank 15 on one side and a complete hydronic home heating system 16 on the opposite side to utilize the under counter space. Tank 15 includes a heating element 17 submerged within the tank for heating the water to be retained in tank 15. The heating element 17 is connected by wires 18 and 19 to a power system which includes a domestic hot water Aquastat 41 illustrated in FIG. 2. Tank 15 is also provided with an inlet water pipe 20 and an outlet water pipe 21, pipe 21 extending to the Aquastat 41. The outlet pipe 23 supplying the flow of domestic hot water utilized in the apartment. Cabinet 10 in the under counter space on the right hand side is provided with a complete hydronic home heating system 16 that is comprised of an electric heating element or elements 22 (FIG. 2) as the case may be in which the element or elements 22 are submerged in a heating manifold 24. Heating elements 22 is connected by wires 18A and 19A to the power system FIG. 2). Manifold 24 is connected by a pipe 25 to a pump 26. Pump 26 is connected by a pipe 27 to a high limited Aquastat 28. The high limit Aquastat is connected by a pipe 29 to one or more radiation heating elements 30 strategically positioned within the apartment for heating the complete apartment. A return pipe 31 is provided to connect the radiation element or elements to manifold 24. Thus with everything connected as described the domestic hot water Aquastat 41 may be set at a desired hot water temperature for example 140°. The power supply will first heat the domestic hot water supply to 140° when the Aquastat will cut out the power and shunt it to the hydronic home heating system. If the thermostat 53 is demanding heat the hydronic home heating system will be in operation, the electric power is supplied to element 22 to heat the water within manifold 24. When the water in manifold 24 has been heated, pump 26 will circulate the water from manifold 24 through the heating system as described and return the water after its circulation back to manifold 24 to be reheated and recirculated. The control of the heating system and the domestic hot water supply is illustrated in FIG. 2.

Referring to FIG. 2 the power supply system and control are schematically illustrated in which there is a terminal block T to which the power supply P is connected to provide 220 volts and 115 volts and in which there are two terminals 31 and 32 for supplying the 220 volts. Also provided in the terminal blocks are two terminals 33 and 34 in which 115 volts are provided. The terminal 31 is connected by line 35 to one side of both of the heating elements 17 and 22. Terminal 32 is connected by line 36 to contacts of control relay 37 and a control relay 40. Relay 40 controls the operation of element 22 and relay 37 controls the operation of element 17. The 115 volt circuit is connected from terminal 33 to a terminal C of a domestic hot water Aquastat 41 by line 42 and on the opposite side terminal 34 is connected by a line 43 to relay 37. To complete the 115 volt circuit, relay 37 is in turn connected by line 44 to a second terminal NC. Relay 40 is also connected to the 115 volt circuit by a line 46 to line 43 to supply one side of the 115 volt circuit. The opposite side of relay 40 is connected by a line 47 to a high limit Aquastat 48. The opposite side of Aquastat 48 is connected by a line 49 to a line 50. Line 50 is connected to terminal 51 of the terminal block. Line 50 is also connected to one side of pump 26 by line 52. The opposite side of pump 26 is connected by the line 46 to line 43 and the opposite side of the 115 volt circuit. A thermostat 53 is included to detect the ambient temperature within the apartment. With the thermostat set at a desired temperature, say 78°. When the temperature within the apartment drops below 78° the thermostat 53 will close a circuit from "P" through line 42 to C. When the domestic hot water has been heated to the desired temperature and Aquastat 41 expands, the circuit will be shunted through contact NO through a line 56 to contact 57 and on through a line 58 to terminal 59 of the thermostat 53. With the thermostat demanding heat the circuit will pass through the thermostat to terminal 54, through line 55 to terminal 51, through line 50 and line 52 to the pump 26, pump 26 is connected on the opposite side by line 46 to line 43, line 43 being connected to the neutral side of the power lines P. Line 50 is also connected to line 49, thus the circuit will continue through the normally closed contact of the high limit Aquastat 48, through line 47 to relay 40. Relay 40 is connected on the opposite side to line 46, line 46 being connected to line 43 and line 43 connected through terminal 34 to the 115 volt side of P. Thus relay 40 is energized closing its contact to complete the 220 volt circuit to element 22. Power is supplied from the high side of P through terminal 31 and line 35 to line 19A, to element 22, the opposite side of element 22 is connected by line 18A through the closed contact of relay 40, through line 36A, through line 36, through terminal 32 to the middle leg of P to complete the circuit.

With element 22 energized the water in manifold 24 will be heated, and in pump P operating, the heated water will circulate through Aquastat 28 and the rest of the heating system. When the water is heated to the heat setting (110°+) the element in the Aquastat 48 will expand opening its contact and breaking the circuit to relay 40. This releases the contact of relay 40 and breaks the power circuit to element 22. Although the heating circuit is broken, the pump circuit continues as long as the thermostat 53 remains closed. When thermostat 53 opens the circuit to the pump 26 is broken and the pump stops. It is apparent that only element 17 can be energized initially and only when it has satisfied the domestic hot water Aquastat, will the power be cut off for element 17 and connected to element 22. Thus there is never a demand for power greater than the load of either element taken alone. For example, if elements 17 and 22 are rated of 7 kw. then the power requirement will never exceed 7 kw.

FIG. 3 provides a further embodiment of the power circuit in which the elements 17 and 22 may be divided into two elements each 17A, 17B, and 22A, 22B with ratings of 3½ kw. Thus only 3½ kw. will be pulled initially for element 17A through lines 44 and 43 the power circuit, then as soon as the time delay heat expansion contact 60 is closed, the time delay relay 61 will be energized closing the circuit to provide an additional 3½ kw. to element 17B thus increasing the load to 7 kw. Since only one system can work at a time, the domestic hot water circuit through elements 17A will pull 3½ kw. then through element 17B another 3½ kw., then when the system is heated, the power circuit is shunted to the hydronic home heating system. Again the initial pull of power will be 3½ kw. through element 22A then when the time delay relay is closed another 3½ kw. will be supplied through element 22B. The power demand may vary, that is, instead of two 3½ kw. elements, there may be two 7 kw. elements thus pulling a maximum of 14 kw. or the rating of the domestic hot water may be 10 kw. and this may be divided so that 5 kw. is pulled initially and another 5 kw. added after the time delay relay is activated. The circuit illustrated in FIG. 3 may be followed by assuming line 44 is connected to the Aquastat as shown in FIG. 2 and line 43 connected to the neutral leg of the power circuit. With the Aquastat as shown in FIG. 2, power will flow through line 44 to relay 37B and line 43 connected on the opposite side to the neutral leg causes relay 37B to close. Relay 37B thus closes the 220 volt circuit from line 36A through element 17A and through line 35 to the power circuit. This produces a load of 3½ kw. Line 44 is also connected through a resistance R which is in turn connected by a line 62 through contact 61A and line 64 to line 43 to complete the circuit. The time delay in expanding the bellows or expansion contact 60 is governed by the resistance R. When contact 60 closes the circuit is completed from line 44 around the resistance through contact 60A through line 63 to relay 61. The opposite side of relay 61 is connected by line 64 to line 43 to complete the holding circuit. When relay 61 is energized, contacts 61A and 61B are closed, that is, power flows from line 43 through line 64, through contact 61A to the relay 37A, the opposite side of relay 37A is connected by line 65 to line 44 to complete the circuit. When relay 37A closes, the 220 volt circuit will be completed from line 36A to element 17B, the opposite side of element 17B being connected to line 35 to complete the power circuit. The opening of resistance R does not break the circuit that is being held through contact 61B. The circuit for the hydronic home heating system utilizing two elements of half the rating is similar to that shown in FIG. 3 in which element 22 is replaced by elements 22A and 22B.

It is to be understood that although the circuit for the cooking burners 11 and the circuit for the broiler and oven 12 are not illustrated, they may be added to the circuit illustrated in FIG. 2 and they may be similarly controlled in sequence, that is, when the burners 11 are turned on they may take all preference on initial power demand and each additional burner may be energized in a similar fashion to the sequential control illustrated in FIG. 3. Also the broiler and oven may be similarly actuated in sequence, thus all power demands of the complete appliance may be supplied in a step by step sequence so that a gradual increase in power is provided without an excessive demand or surge being produced.

Although I have illustrated a particular type of electrically operated appliance, the general form of the appliance may vary, and although I have specifically set forth the combination of two components that are operated in sequence to provide excessive power demands or surges of power, it is to be understood that two or more components may be similarly connected to be energized in sequence and provide a control over the power demands of the complete device without departing from the spirit of this invention and this invention shall be limited only by the appended claims.

What is claimed is:

1. A combination electrically operated appliance mounted in a single housing for use in living quarters in which the power supply is preset as less than the total demand for all appliances but adequate for any one appliance if applied in sequence and in which one appliance is to be preferred and the kw. of that appliance governs the total power demand, the preferred appliance being a domestic hot water heater an Aquastat to control the temperature desired for hot water use, said Aquastat having a bellows and a switch having two sets of contacts, one set of contacts connecting said hot water heater to said kw. power supply in the ON position of said Aquastat, said second set of contacts being connected to a second appliance to provide the kw. power supply for heating it during the OFF cycle of said preferred appliance, said second appliance comprising a water heating means and means for circulating water from said heating means though a heat distribution sytem, said heating being provided with a second Aquastat to limit the power supply to said heating means to limit the water temperature below a predetermined temperature setting, said circulating means connected to a thermostat so that the temperature demand for heat will energize said circulating means and the temperature setting of said thermostat will cut-off the circulating means and stop circulation of the hot water.

2. In a device according to claim 1 in which each of said appliances has at least one electrical heater.

3. In a device according to claim 1 in which each of said appliances has a plurality of electrical heaters.

4. In a device according to claim 3 in which each of said plurality of heaters is operated sequentially.

References Cited

UNITED STATES PATENTS

| | | | |
|---|---|---|---|
| 2,643,323 | 6/1953 | Carlson et al. | 219—283 |
| 3,005,109 | 10/1961 | Funkhouser et al. | 219—485 |

GEORGE HARRIS, Primary Examiner

F. E. BELL, Assistant Examiner